Figure 1:
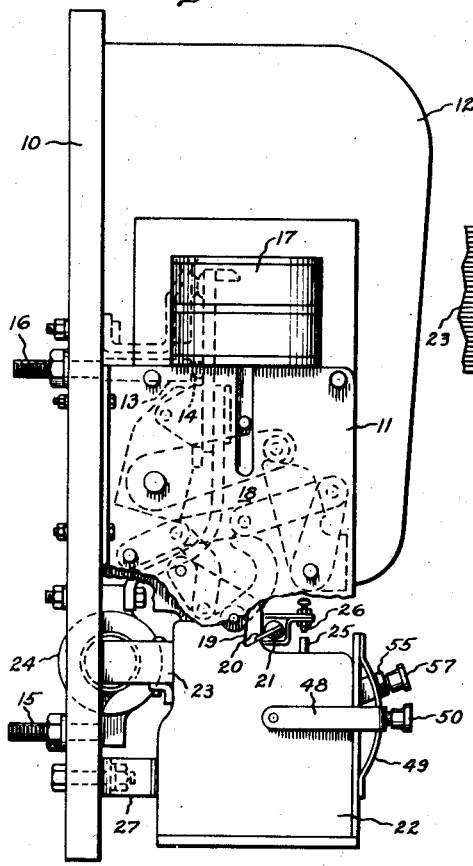

Jan. 29, 1946.    R. M. BENNETT ET AL    2,393,736
TIME DELAY DEVICE
Filed Dec. 24, 1943    3 Sheets-Sheet 1

Inventors:
Robert M. Bennett,
Gerald H. Syrovy,
by Harry E. Dunham
Their Attorney.

Jan. 29, 1946.    R. M. BENNETT ET AL    2,393,736
TIME DELAY DEVICE
Filed Dec. 24, 1943    3 Sheets-Sheet 2

Inventors:
Robert M. Bennett,
Gerald H. Syrovy,
by Harry E. Dunham
Their Attorney.

Jan. 29, 1946. R. M. BENNETT ET AL 2,393,736
TIME DELAY DEVICE
Filed Dec. 24, 1943 3 Sheets—Sheet 3
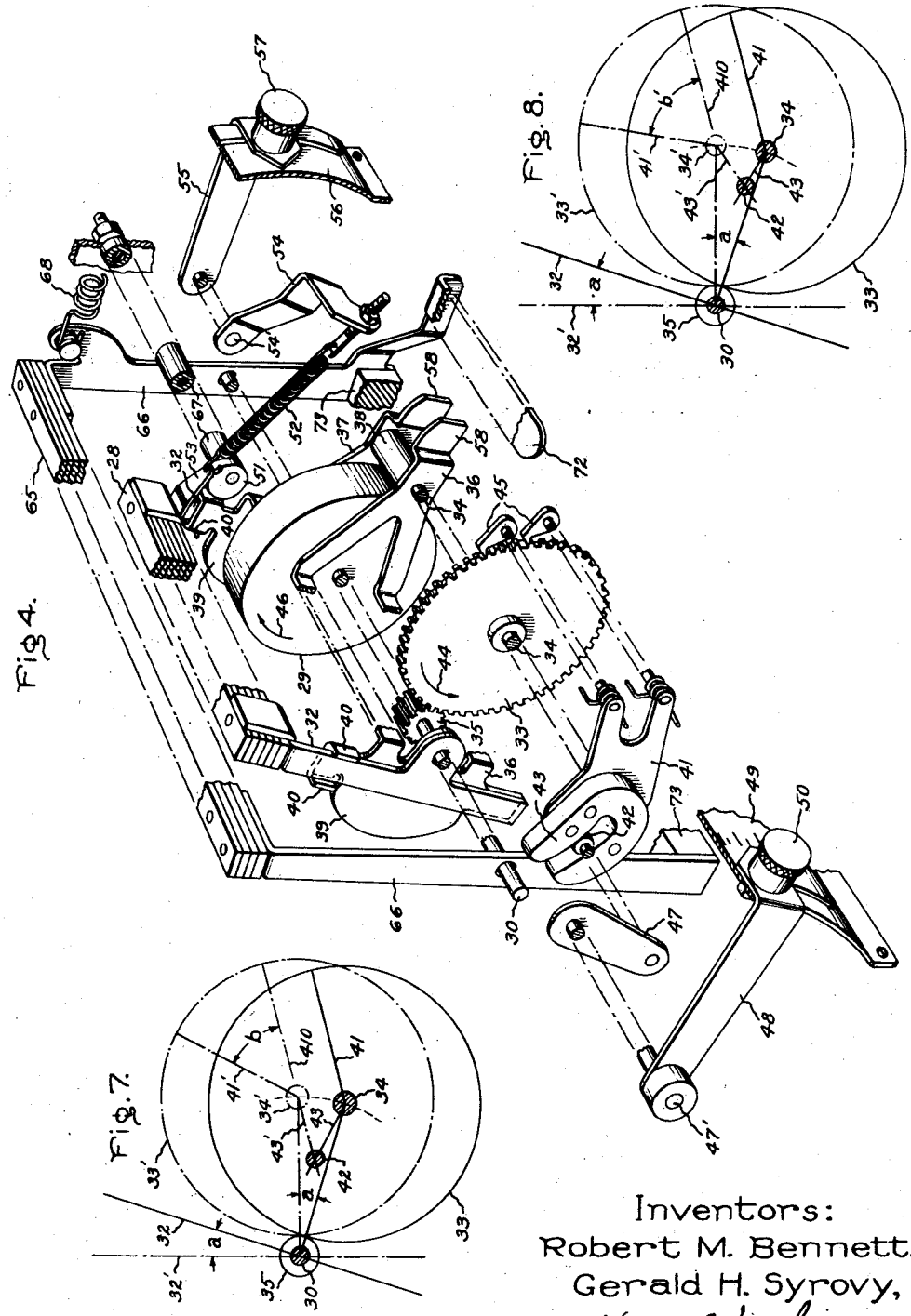
Inventors:
Robert M. Bennett,
Gerald H. Syrovy,
by Harry E. Dunlap
Their Attorney.

Patented Jan. 29, 1946

2,393,736

UNITED STATES PATENT OFFICE 2,393,736

TIME DELAY DEVICE

Robert M. Bennett, Ithan, and Gerald H. Syrovy, Philadelphia, Pa., assignors to General Electric Company, a corporation of New York Application December 24, 1943, Serial No. 515,532

21 Claims. (Cl. 188—103)

Our invention relates to improvements in time delay devices and more particularly time delay electroresponsive devices which function in response to predetermined conditions of an electric circuit to effect any one or more desired operations such, for example, as tripping a circuit breaker either directly or indirectly a predetermined time after the occurrence of an abnormal circuit condition.

In the protection of electric circuits, there are usually several protective devices, such as circuit breakers, arranged in series between the source and the load. Thus, for example, there may be a circuit breaker between the source and the bus, others between the bus and each feeder supplied therefrom, and still others between each feeder and the loads supplied thereby. Obviously, if a load, such as a motor, is at fault through excessive loading or otherwise, only the circuit breaker between the feeder and this motor should open to clear the faulty condition. Otherwise, if the circuit breaker between the bus and the feeder were to open, all loads supplied by the feeder would be deprived of service. Similarly, if the circuit breaker between the source and the bus were to open, then all feeders connected to the bus would be deprived of service. Likewise, in case of a faulty feeder, only the circuit breaker connecting that feeder to the bus should open.

To insure the much desired continuity of service, the necessary selectivity may be obtained on a time basis by so grading the tripping times of the circuit breakers that the circuit breaker nearest the load trips the quickest, while the circuit breakers toward the source have progressively increasing tripping times. To accomplish this result satisfactorily, it is necessary to provide electroresponsive tripping devices, the times of of operation of which can readily be graded to the protective requirements of the circuit in question. Moreover, these times of operation must be dependable and not affected by temperature changes and the like. Also, it is most desirable to be able readily to adjust the time of response and the sensitivity of response independently of each other. Furthermore, when the circuit breaker nearest the fault operates, the electroresponsive devices of the other circuit breakers in the circuit should be free to reset substantially instantaneously in order to prevent their tripping operation and also to have them quickly reset and ready for immediate response to the next abnormal circuit condition. Also, when the electroresponsive device is arranged directly to trip the circuit breaker, its tripping member must be actuated with the necessary tripping force regardless of the time or sensitivity settings.

An object of our invention is to provide an improved time delay device, and more specifically an improved time delay electroresponsive device wherein the timing action is effected by imparting energy to a movable mass. Another object of our invention is to provide an improved time delay device in which a relatively limited movement of an operating member is effective to cause a desired movement of another member, which is in turn operative to effect the movement of the movable mass. Still another object of our invention is to provide a time delay electroresponsive device, the time of response and sensitivity of response of which can readily be varied independently of each other. A further object of our invention is to provide a time delay device which is substantially instantaneously and freely resetting upon removal or decrease of its energizing force below a predetermined minimum value. A still further object of our invention is to provide for circuit breakers a time element, electroresponsive, direct trip device which provides the necessary tripping force at relatively low current values independently of the time setting. Also, an object of our invention is to provide a time delay device, the operating times of which are substantially unaffected by temperature and the like. These and other objects of our invention will appear in more detail hereinafter.

In accordance with our invention, we provide a time delay device in which an operating member such, for example, as the armature of an electromagnet, when given a predetermined movement, is effective to produce movement of another member arranged to actuate a movable retarding element, and more specifically a rotatably mounted element having a relatively large moment of inertia about its axis of rotation. Further in accordance with our invention, we provide an improved time delay device, the timing action of which is based on the inertia of the moving element so as to be independent of temperature and the like, and more specifically a time delay electroresponsive device of which the sensitivity of response and timing period can readily be varied independently of each other. Also in accordance with our invention, we provide a rugged and compact time delay electroresponsive device which is substantially instantaneously resetting independently of the movement imparted to the movable retarding element and which is readily adapted to be applied to a circuit breaker to effect the direct tripping thereof under predetermined circuit conditions.

Our invention will be better understood from the following description when considered in connection with the accompanying three sheets of drawings, and its scope will be pointed out in the appended claims.

Figure 5:
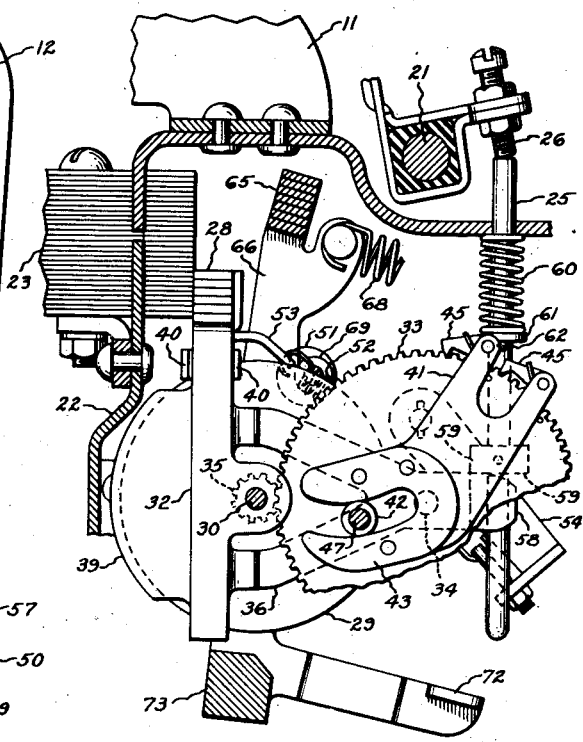
Figure 6:
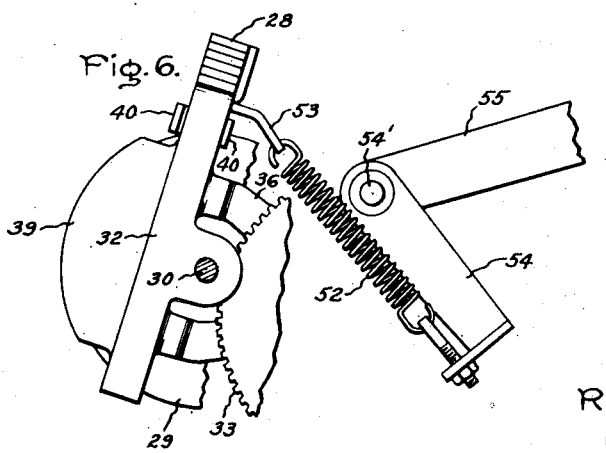
Figure 2:
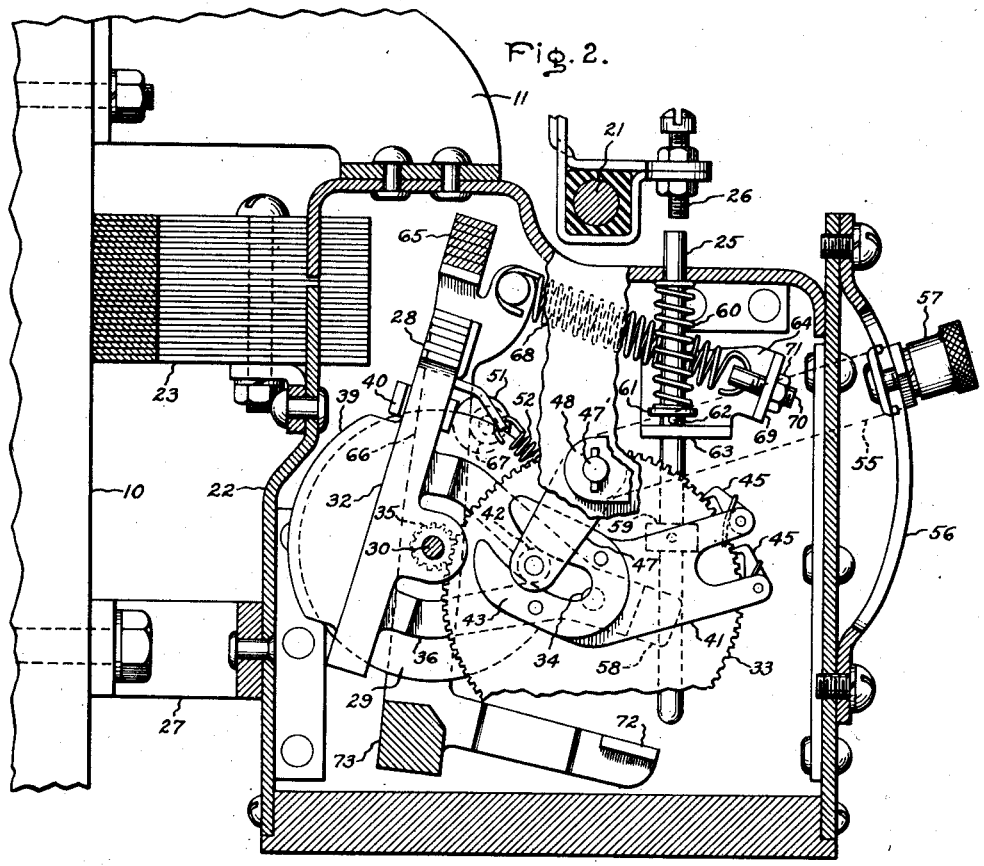
Figure 3:
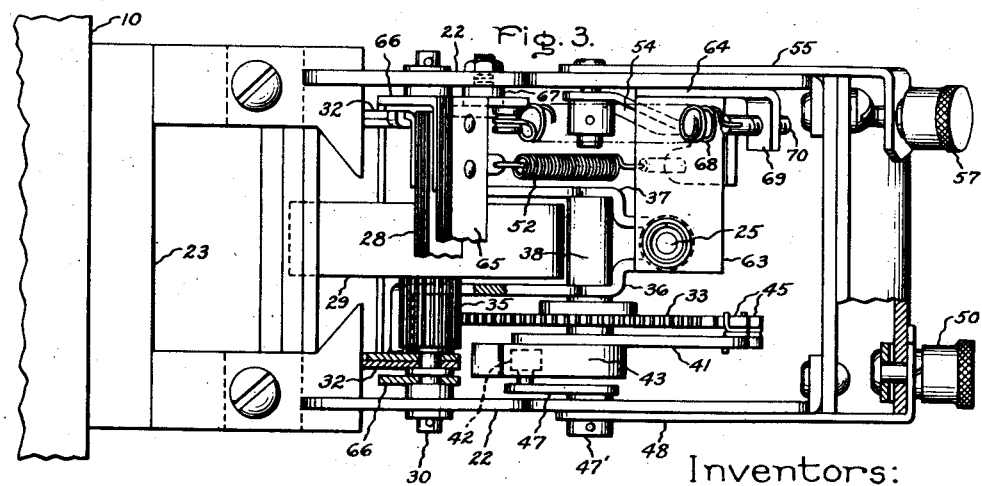

In the accompanying three sheets of drawings, Fig. 1 illustrates, in vertical side elevation, a circuit breaker to which a time delay electroresponsive direct trip device embodying our invention has been applied; Fig. 2 is a side elevation, partly in section, of the time delay electroresponsive trip device shown in Fig. 1, with the parts positioned as under normal circuit conditions; Fig. 3 is a top plan view, partly in section, of the trip device shown in Fig. 2; Fig. 4 is an exploded perspective of the trip device shown in Fig. 2; Fig. 5 is a side elevation, similar to Fig. 2, showing the parts in the circuit breaker tripping position; Fig. 6 is a side elevation of a detail illustrating the mechanism for varying the sensitivity of response of the trip device shown in Fig. 2; and Figs. 7 and 8 are diagrams explanatory of the operation of the illustrated embodiment of our invention.

In Fig. 1, we have illustrated a time delay electroresponsive direct trip device embodying our invention as applied to the circuit breaker mechanism disclosed in United States Letters Patent 2,152,453, issued March 28, 1939, to the assignee of our invention. As shown, this circuit breaker mechanism is supported on a base 10 and a frame 11 arranged to support arc barriers 12. The circuit breaker mechanism comprises relatively movable cooperating contacts 13 and 14 conductively connected to terminals 15 and 16. The movable contact 14 is actuated to the closed position by an operating solenoid 17, which is arranged to move a collapsible operating mechanism 18, shown in dotted lines, into the thrust transmitting position illustrated. This mechanism is maintained in this position by suitable latching engagement between a latch 19 and a cooperating detent 20. This detent 20 is rigidly mounted on a trip shaft 21, which extends across all poles in a multipole breaker so that it can be actuated in the releasing direction, counterclockwise as shown, to effect the opening of the circuit breaker on the occurrence of an abnormal circuit condition to which the tripping device of any pole is responsive. In Fig. 1, the illustrated embodiment of our invention is shown generally by its housing 22, a U-shaped magnet 23, an energizing winding 24 therefor connected in series relation with the circuit breaker contacts, and a trip rod 25 movable into tripping engagement with an adjustable projection 26 on an extension of the trip shaft 21. The trip device housing 22 is suitably secured to the base 10 as by a brace 27 and to a portion of the circuit breaker frame 11, as shown most clearly in Fig. 2.

In accordance with our invention, we provide an operating member or operator, such as an armature 28, which is mounted for a predetermined movement upon sufficient energization of the electromagnet 23. For retarding the movement of the armature 28 in one direction, that is movement to the attracted position, as shown, we provide a rotatably mounted element 29, which, in what we now consider the preferred form of our invention, is in effect a flywheel having a relatively large moment of inertia about its axis of rotation, such as the axis of a shaft 30, which is suitably journalled in the sides of the housing 22 as shown in Fig. 3. Also, as shown, the armature 28 may be mounted for angular movement about the axis of rotation of the flywheel element 29 by suitable supports 32 which turn freely on the shaft 30.

For actuating the element 29 in response to the movement of the armature 28 to the attracted position, we provide a cooperating member, such as a gear 33, which is mounted for rotation about an axis movable through a predetermined angular range. In the illustrated embodiment of our invention, this angular range is the same as the angular movement of the armature. The axis of rotation of the gear 33 is the center line of a shaft 34 on which the gear 33 is freely rotatable. This gear engages a pinion 35 which is rigidly associated or integral with the flywheel element 29 and rotatable therewith on the shaft 30. For simultaneously moving the shaft 34 and the armature 28 through substantially the same angular range, we provide suitable mounting means, such as brackets 36 and 37, which are mounted to turn freely on the shaft 30 and which are suitably rigidly secured to each other with an intervening spacer 38. Although the brackets 36 and 37 could constitute the support for the armature 28 in direct current switch applications, we prefer to have some freedom of movement in alternating current switch applications to reduce the amount of vibration transmitted to the gear elements 33 and 35 so as to minimize wear of the teeth thereof. To this end, the arms 39 of the mounting brackets may be provided with shoulder portions 40 spaced slightly farther apart than the width of the armature support 32, as shown more clearly in Figs. 2, 4 and 5.

In order to effect rotation of the flywheel element 29 in response to the movement of the armature 28 to the attracted position, we provide means carried by the mounting of the member 33 for effecting rotation thereof through a variable angular range from a relatively small amount to a value materially larger than the range of angular movement of the armature so that the member 33 will not just merely roll over the pinion 35 without effecting rotation thereof. This motion variation means comprises a control means which is rigidly positioned relatively to the axis of rotation of the member 33 for bodily movement therewith. Thus, as shown, this control means is a lever 41 which is rigidly secured to the shaft 34. The motion amplifying means further comprises fixed guiding means in relatively movable engagement with the lever 41. As shown, this guiding means is a stationarily positioned roller 42, which rolls in a slot such as a forked portion 43 of the lever 41. In order to effect the desired range of movement of the member 33 in the direction shown by the arrow 44 as the armature 28 is moved to the attracted position, we provide means movable with the control means or lever 41 for holding this lever and the member 33 against relative movement. As shown, this holding or clutch means comprises two spring biased pawls 45, both arranged to hold in the same direction. Although one pawl would, in general, be sufficient, we prefer to use two since this insures a more positive locking engagement, especially in the event that one pawl should fail to register with a tooth slot.

Inasmuch as the inertia of the flywheel element 29 is likely to keep it rolling in the direction indicated by the arrow 46 after a fault is cleared, such rolling would prevent a quick reset of the armature 28 and thus interfere with the desired timing operation of the device and possibly cause false tripping. In order to prevent this, the clutch holding means is of the one-way type. In other words, upon deenergization or release of the armature regardless of its position, the member 33 may continue to turn in the direction indicated by the arrow 44 under the action of the rotating element 29, but the shaft 34 and associated parts can move freely about the shaft 30 from the position shown in Fig. 5 to the position shown in Fig. 2.

For varying the angular range of movement of the member 33 so as to change the timing action of the device, we provide a movable mounting for the guiding means or roller 42 whereby the position of this roller relatively to the axis of rotation of the member 33 can be varied. This change in the position of the roller relatively to the slot in the lever 41 changes the angle of rotation of the member 33, as will be explained in connection with the operation of our device. As shown, the roller 42 is mounted on a rotatable arm 47 pivotally supported at 47' and provided with a setting lever 48. This lever is movable over a suitably graduated timing scale 49 to which the lever may be suitably clamped in any desired position as by a thumb screw 50. Also as shown, the slot in the lever arm 43 is circular in form with a radius substantially equal to the throw of the crank 47 since this provides slightly more length for a given space requirement than would a straight slot. With this circular slot, the resetting forces required are also reduced.

Movement of the armature 28 to its normal unattracted position is limited by a stop 51. In order to provide some air gap adjustment to offset manufacturing variations, the stop 51 is preferably adjustable. Thus, it may have an eccentric contour, as shown most clearly in Fig. 4. For effecting the return movement of the armature 28 and its associated movable parts, we provide suitable biasing means, such as a spring 52, which, in the illustrated embodiment of our invention, is so arranged that the sensitivity of pickup or response can readily be varied without materially changing the length of the spring. Thus, as shown, one end of the spring 52 is secured to an ear 53 on the armature support and the other end is adjustably secured to a member 54 mounted on a fixed pivotal support 54' so positioned that for the range of sensitivity of response of the device, the angle between the axis of the spring and the arm 54 is relatively small. The member 54 is arranged to be actuated by a setting lever 55, which is movable over a pickup adjusting scale 56 to which the lever can be suitably clamped in any desired position as by a thumb screw 57.

With this arrangement, the length of the spring 52 is maintained substantially constant, but as will appear more clearly from Fig. 6, the torque arm of the spring force is effectively varied in length by reason of the change in angularity between the armature support 54 and the spring as the setting lever 55 is moved. By this movement of the setting lever, the spring moment acting on the armature is therefore readily variable to change the pickup as desired. With this arrangement, it is possible to make the calibration plate and stamp the numbers thereon before the device is tested and calibrated. Moreover, with this arrangement, it is possible to obtain successful operation with spring gradients having a wide latitude of tolerance. If the spring arm 54 were pivoted differently so that the spring length and resultant tension changed as the arm was moved, the calibrating marks on the scale 56 would be spread apart or crowded together depending upon the gradient of the particular spring used with each device.

For effecting the upward movement or tripping actuation of the trip rod 25 when the armature 28 is moved to its attracted position with a time delay dependent on the setting of the guiding means 42, the brackets 36 and 37 are provided with spaced projections 58, one on each side of the trip rod for engagement with a collar 59 thereon near the end of the armature movement. As shown more clearly in Fig. 2, the trip rod 25 is biased to its normal down position by a spring 60 positioned between the top of the frame 22 and a washer 61 whose downward movement on the rod is limited by a pin 62, the engagement of which with the guiding shelf 63 of a bracket 64 limits the downward movement of the trip rod.

Inasmuch as it is often desirable to have a circuit breaker tripped substantially instantaneously in response to currents of short-circuit magnitude, we provide an instantaneous tripping armature 65 which, for simplicity and compactness of structure, may be mounted on two supports 66 freely rotatable on the shaft 30. The instantaneous tripping armature 65 is biased to its normal unattracted position against the stem 67 of the stop 51 by suitable means, such as a spring 68, which extends between one of the supports 66 and an arm 69 on the bracket 64, as shown more clearly in Fig. 2. The anchorage of the spring 68 to the bracket arm 69 may be by suitable adjusting means, such as the cooperating threaded members 70 and 71. For actuating the trip rod 25 by the armature 65 as it moves to the tripping position, one of the armature supports 66 is provided with a tripping arm 72 which is arranged to move into engagement with the lower end of the trip rod 25 and move it to the tripping position, as shown more clearly in Fig. 2. For greater rigidity and counterweight purposes, the instantaneous tripping armature supports 66 may be connected by a cross member 73.

Reference will now be had to Fig. 7 for an explanation of the operation of the illustrated embodiment of our invention, and particularly that feature whereby for a given movement of the armature 28 a materially larger movement of the member 33 is effected. In Fig. 7, the various parts are schematically shown in their normal relative positions by full lines respectively numbered to correspond to the parts and in the tripping position by dash-dot lines with the same numbers primed. As the armature 28 moves to the attracted position, its support 32 moves through an angle $a$ to the position 32', and, neglecting the slight lost motion between the supports 32 and the shoulder portions 40 and the brackets 36 and 37, the shaft 34 is revolved about the shaft 30 through substantially the same angle $a$ to the position 34'. During this movement, the lever 41 has moved to the position 41' since its arm 43 is constrained by the fixed element 42. Inasmuch as the arms 41 and 43 are fixed relatively to each other, it is clear that the lever 41 has moved counterclockwise through an angle $b$, that is, the angle between 41' and a line 410 drawn parallel to 41 through the center of rotation of the member 33. This angle $b$ is obviously several times the angle $a$, but since the lever 41 is locked to the member 33 by the pawls 45 for counterclockwise rotation, it is clear that the member 33 cannot merely roll over the pinion 35 but must turn this pinion sufficiently to insure the required inertia time delay action by the flywheel element 29. The number of turns the flywheel 29 makes while the armature 28 is moving to the attracted position is of course dependent on the setting of the roller 42, a variable factor and the tooth ratio of the gear 33 and the pinion 35, a constant factor in a given device for convenience.

Fig. 7 illustrates the parts schematically with the time delay adjustment shown in Figs. 1 to 5 inclusive. In Fig. 8, we have illustrated the parts schematically with a different time delay setting such as would be obtained by turning the time setting lever 48 counterclockwise as viewed in Fig. 2. With this setting, it will be observed that the initial distance between the centers of the shaft 34 and the roller 42 is smaller than in Fig. 7. In other words, the effective length of the lever arm 43 is shortened. In consequence of this, the lever 41 is rotated counterclockwise through an angle b' which is larger than the angle b of Fig. 7. Therefore, the gear 33, which is locked to the lever 41 for counterclockwise movement, will provide a greater time delay for the movement of the armature 28 through the same angle a, as in Fig. 7. In other words, if the time adjustment roller 42 is moved toward the closed end of its slot, the effective length of the lever arm 43 is reduced thereby decreasing the torque on the gear 33. This in turn decreases the torque applied to the flywheel 29 and also increases the angular movement of the flywheel before tripping can occur.

By moving the time lever 48 to its lowest setting, the roller 42 will in the unattracted position of the armature 28 occupy its extreme outer position in the slot of the member 43, that is to say, the distance between the axes of the roller 42 and the shaft 34 is a maximum. Under these conditions, when the armature 28 is moved to the attracted position, the gear 33 merely rolls over the pinion 35 without effecting movement of the pinion and its rigidly associated flywheel 29. Consequently, there is no essential time delay. In other words, the action of the device is what is known as substantially instantaneous. The actual angular movement of the gear 33 and the forked lever 41 is equal to the angular movement of the shaft 34 about the shaft 30 plus the rotation of the gear 33 on its own shaft 34. This latter rotation, although small, is dependent on the tooth ratio of the gear 33 and the pinion 35. Because of lost motion due to the required clearances and manufacturing tolerances, the maximum distance between the axes of the roller 42 and the shaft 34 in the unattracted position of the armature may be somewhat less than that theoretically required.

Assuming now that the parts of the circuit breaker and the direct trip device are positioned as shown in Figs. 1 and 2, then upon the occurrence of current through the circuit breaker of a predetermined value, the winding 24 will be energized sufficiently to attract the armature 28 against the bias of the spring 52. As the armature 28 moves to the attracted position, the shaft 34 is revolved counterclockwise about the shaft 30 to turn the control lever 41 and therefore effect counterclockwise rotation of the member 33 through an angle greater than the angular movement of the armature, as heretofore explained. This causes the rotation of the flywheel member 29 with an acceleration which is a measure of the setting of the guiding element 42, the position of which controls the angular movement of the control lever 41 for a given time setting. Overcoming the inertia of the flywheel element 29 to bring it up to speed then delays the movement of the armature 28 to the attracted position. As the armature approaches the attracted position, the projections 58 on the members 36 and 37 engage the collar 59 on the trip rod 25 and raises this rod against the bias of its spring 60 to engage the projection 26 on the trip shaft 21, which is thus turned counterclockwise. The parts are now positioned as shown in Fig. 5. The counterclockwise movement of the trip shaft 21 releases the detent 20 from the latch 19 and thereby effects the release of the collapsible mechanism 18 of the circuit breaker to cause its opening.

If at any time during the delayed movement of the armature 28 to the attracted position the current in the winding 24 should fall below a value sufficient to overcome the bias of the spring 52, the armature is free to return or reset substantially instantaneously since the shaft 34 can freely revolve clockwise about the shaft 30 in view of the one-way ratchet mechanism 46 which couples the lever 41 to the member 33, as heretofore explained. Upon the return of the armature to its normal unattracted position, the trip rod 25 is free to return under the bias of the spring 60 to the position shown in Fig. 2.

In the event of the flow of current of short-circuit magnitude, such as that for which the armature 65 is set to respond, then this armature is substantially instantaneously moved to the attracted position. In this movement, its tail portion 72 engages the tripping rod 25 to raise it to the tripping position shown in Fig. 5.

In the illustrated embodiment of our invention, raising the thumb screw 50, that is to say, turning the setting lever 48 counterclockwise, increases the time delay response of the armature 28. Also, raising the thumb screw 57 so as to turn the current setting lever 55 counterclockwise decreases the sensitivity of response of the armature 28; that is, a larger current is necessary in the winding 24 to effect the movement of the armature to the attracted position.

While we have shown and described our invention in considerable detail, we do not desire to be limited to the exact arrangement shown, but seek to cover in the appended claims all those modifications that fall within the true spirit and scope of our invention.

What we claim as new and desire to secure by Letters Patent of the United States, is:

1. In combination, an operator mounted for a predetermined movement, means for effecting the movement of said operator in one direction, and means for retarding the movement of said operator in said direction comprising a rotatably mounted element, a cooperating member for actuating said element, means mounting said member for rotation about an axis movable through a predetermined angular range, said mounting means being arranged to be actuated by said operator upon movement thereof, and means carried by said mounting means for effecting rotation of said member upon movement of said operator in said direction.

2. In combination, an operator mounted for a predetermined movement, means for effecting the movement of said operator in one direction, and means for retarding the movement of said operator in said direction comprising a rotatably mounted element, a cooperating member for actuating said element, means mounting said member for rotation about an axis movable through a predetermined angular range, said mounting means being arranged to be actuated by said operator upon movement thereof, means carried by said mounting means for effecting rotation of said member upon movement of said operator in said direction, and means for effecting movement of said operator in the opposite direction independently of the rotation of said element.

3. In combination, an operator mounted for a predetermined movement, means for effecting the movement of said operator in one direction, and means for retarding the movement of said operator in said direction comprising a rotatably mounted element, a cooperating member for actuating said element, means mounting said member for rotation about an axis movable through a predetermined angular range, said mounting means being arranged to be actuated by said operator upon movement thereof, means carried by said mounting means for effecting rotation of said member upon movement of said operator in said direction, and means for varying the range of rotation of said member independently of the magnitude of the predetermined movement of said operator.

4. In combination, an operator mounted for a predetermined movement, means for effecting the movement of said operator in one direction, and means for retarding the movement of said operator in said direction comprising a rotatably mounted element having a relatively large moment of inertia about its axis of rotation, a cooperating member for actuating said element, means mounting said member for rotation about an axis movable through a predetermined angular range, said mounting means being arranged to be actuated by said operator upon movement thereof, and means carried by said mounting means for effecting rotation of said member through an angular range differing from said predetermined angular range upon movement of said operator in said direction.

5. In combination, an operator mounted for a predetermined movement, means for effecting the movement of said operator in one direction, and means for retarding the movement of said operator in said direction comprising a rotatably mounted element having a relatively large moment of inertia about its axis of rotation, a cooperating member for actuating said element in a given direction, means mounting said member for rotation about an axis movable through a predetermined angular range, said mounting means being arranged to be actuated by said operator upon movement thereof, means carried by said mounting means for effecting rotation of said member through an angular range differing from said predetermined angular range upon movement of said operator in said one direction, and means for effecting movement of said operator in the opposite direction independently of the rotation of said element in said given direction.

6. Means for retarding the movement in one direction of the armature of a time delay electromagnetic device upon a predetermined energization thereof comprising a rotatably mounted element, a cooperating member for actuating said element, means mounting said member for rotation about an axis movable through a predetermined angular range, said mounting means being arranged to be actuated by said armature upon movement thereof, and means carried by said mounting means for effecting rotation of said member through an angular range differing from said predetermined angular range upon movement of said armature in said direction.

7. Means for retarding the movement in one direction of the armature of a time delay electromagnetic device upon a predetermined energization thereof comprising a rotatably mounted element, a cooperating member for actuating said element in a given direction, means mounting said member for rotation about an axis movable through a predetermined angular range, said mounting means being arranged to be actuated by said armature upon movement thereof, means carried by said mounting means for effecting rotation of said member through an angular range differing from said predetermined angular range upon movement of said armature in said one direction, and means for effecting movement of said armature in the opposite direction independently of the rotation of said element in said given direction.

8. Means for retarding the movement in one direction of the armature of a time delay electromagnetic device upon a predetermined energization thereof comprising a rotatably mounted element, a cooperating member for actuating said element, means mounting said member for rotation about an axis movable through a predetermined angular range, said mounting means being arranged to be actuated by said armature upon movement thereof, means carried by said mounting means for effecting rotation of said member upon movement of said armature in said direction, and means for controlling the movement of said rotation effecting means to vary the range of rotation of said member independently of the magnitude of the predetermined movement of said armature.

9. In combination, an operator mounted for movement through a predetermined angular range, means for effecting the angular movement of said operator in one direction, and means for retarding the movement of said operator in said direction comprising a rotatably mounted element having a relatively large moment of inertia about its axis of rotation, a cooperating rotatably mounted member for actuating said element, and means mounting said member for actuation by said operator through an angular range materially larger than said predetermined angular range upon movement of the operator therethrough in said direction.

10. In combination, an operator mounted for movement through a predetermined angular range, means for effecting the angular movement of said operator in one direction, and means for retarding the movement of said operator in said direction comprising a rotatably mounted element having a relatively large moment of inertia about its axis of rotation, a cooperating rotatably mounted member for actuating said element in a given direction, means mounting said member for actuation by said operator through an angular range materially larger than said predetermined angular range upon movement of the operator therethrough in said one direction, and means for effecting movement of said operator in the opposite direction independently of the rotation of said element in said given direction.

11. Means for retarding the movement to the attracted position of the armature of an electromagnetic device upon a predetermined energization thereof comprising a rotatably mounted element having a relatively large amount of inertia about its axis of rotation, a cooperating member for actuating said element, means mounting said member for rotation about an axis revolvable through a predetermined angular range, said mounting means being arranged to be actuated by said armature upon movement thereof to the attracted position, and means carried by said mounting means for effecting rotation of said member through an angular range differing from said predetermined angular range upon movement of said armature to the attracted position.

12. Means for retarding the movement to the attracted position of the armature of an electromagnetic device upon a predetermined energization thereof comprising a rotatably mounted element having a relatively large moment of inertia about its axis of rotation, a cooperating member for actuating said element in a given direction, means mounting said member for rotation about an axis revolvable through a predetermined angular range, said mounting means being arranged to be actuated by said armature upon movement thereof to the attracted position, means carried by said mounting means for effecting rotation of said member through an angular range differing from said predetermined angular range upon movement of said armature to the attracted position, and means for effecting movement of said armature from the attracted position independently of the rotation of said element in said given direction.

13. In combination, an operator mounted for movement through a predetermined angular range, means for effecting the angular movement of said operator in one direction, and means for retarding the movement of said operator in said direction comprising a rotatably mounted element, a cooperating rotatably mounted member for actuating said element, and means mounting said member for actuation by said operator through different angular ranges upon said predetermined angular movement of the operator in said direction.

14. In combination, an operator mounted for movement through a predetermined angular range, means for effecting the angular movement of said operator in one direction, and means for retarding the movement of said operator in said direction comprising a rotatably mounted element, a cooperating rotatably mounted member for actuating said element, means mounting said member for actuation by said operator through different angular ranges upon said predetermined angular movement of the operator in said direction, and means for effecting movement of said operator in the opposite direction independently of the rotation of said element.

15. Means for retarding the movement in one direction through a predetermined angular range to the attracted position of the armature of a time electromagnetic device comprising a rotatably mounted element having a relatively large moment of inertia about its axis of rotation, a cooperating rotatably mounted member for actuating said element, a rotatable mounting for said member arranged to be actuated in said direction by said armature through the same angular range as the armature upon movement thereof to the attracted position, and means actuated by the movement of said mounting for effecting movement of said member about its axis of rotation through an angular range materially differing from said predetermined angular range.

16. Means for retarding the movement in one direction through a predetermined angular range to the attracted position of the armature of a time delay electromagnetic device comprising a rotatably mounted element having a relatively large moment of inertia about its axis of rotation, a cooperating rotatably mounted member for actuating said element in a given direction, a rotatable mounting for said member arranged to be actuated in said direction by said armature through the same angular range as the armature upon movement thereof to the attracted position, means actuated by the movement of said mounting for effecting movement of said member about its axis of rotation through an angular range materially differing from said predetermined angular range, and means for effecting movement of the armature and said mounting in the opposite direction independently of the rotation of said member in said given direction.

17. Means for retarding the movement to the attracted position of the armature of a time delay electromagnetic device upon a predetermined energization thereof comprising a rotatably mounted element having a relatively large moment of inertia about its axis of rotation, a cooperating member for actuating said element in a given direction, means mounting said member for rotation about an axis substantially parallel to the axis of rotation of said element, said mounting means being arranged to be actuated by said armature upon movement thereof to revolve the axis of rotation of said member about the axis of rotation of said element through a predetermined angular range, control means rigidly positioned relatively to the axis of rotation of said member for bodily movement therewith, fixed guiding means in relatively movable engagement with said control means for effecting rotation thereof upon movement of the armature to the attracted position, and means movable with said control means for holding the control means and said member against relative movement during movement of the armature to the attracted position arranged to permit relative movement of the control means and said member upon movement of the armature from the attracted position.

18. Means for retarding the movement to the attracted position of the armature of a time delay electromagnetic device upon a predetermined energization thereof comprising a rotatably mounted element having a relatively large moment of inertia about its axis of rotation, a cooperating member for actuating said element in a given direction, means mounting said member for rotation about an axis substantially parallel to the axis of rotation of said element, said mounting means being arranged to be actuated by said armature upon movement thereof to revolve the axis of rotation of said member about the axis of rotation of said element through a predetermined angular range, control means rigidly positioned relatively to the axis of rotation of said member for bodily movement therewith, fixed guiding means in relatively movable engagement with said control means for effecting a predetermined rotation thereof upon movement of the armature to the attracted position, means for varying the position of said fixed guiding means to change the magnitude of the rotation of said control means independently of the magnitude of movement of said armature, and means movable with said control means for locking the control means and said member against relative movement during movement of the armature to the attracted position arranged to permit relative movement of the control means and said member upon movement of the armature from the attracted position.

19. Means for retarding the rotation in one direction through a predetermined angular range to the attracted position of the armature of a time delay electromagnetic device upon a predetermined energization thereof comprising an element mounted for rotation about the axis of rotation of said armature and having a relatively large moment of inertia about said axis, a cooperating member for actuating said element in a given direction, means mounting said member for rotation about an axis substantially parallel to the axis of rotation of the armature, said mounting being arranged to be actuated by said armature to revolve the axis of rotation of said member about the axis of rotation of the armature through the same angular range and in the same direction as the armature moves, a lever rigidly positioned relatively to the axis of rotation of said member for bodily movement therewith, guiding means in slidable engagement with a portion of said lever for effecting rotation thereof upon rotation of the armature and in the same direction as the armature rotates, and means carried by said lever for locking the lever and said member against relative movement upon rotation of the armature in said one direction arranged to permit relative movement of the member and the lever upon rotation of the armature in said opposite direction.

20. Means for retarding the movement to the attracted position of the armature of a time delay electromagnetic device upon a predetermined energization thereof comprising a rotatable element, a cooperating member for rotating said element, means mounting said member for rotation about an axis substantially parallel to the axis of rotation of said element, said mounting means being arranged to be actuated by said armature upon movement thereof to revolve the axis of rotation of said member about the axis of rotation of said element through a predetermined angular range, control means rigidly positioned relatively to the axis of rotation of said member for bodily movement therewith, and means in relatively movable engagement with said control means for effecting a predetermined rotation thereof upon movement of the armature to the attracted position.

21. Means for retarding the movement to the attracted position of the armature of a time delay electromagnetic device upon a predetermined energization thereof comprising a rotatable element, a cooperating member for rotating said element, means mounting said member for rotation about an axis substantially parallel to the axis of rotation of said element, said mounting means being arranged to be actuated by said armature upon movement thereof to revolve the axis of rotation of said member about the axis of rotation of said element through a predetermined angular range, control means rigidly positioned relatively to the axis of rotation of said member for bodily movement therewith, and adjustably mounted means in relatively movable engagement with said control means operable in different positions to effect different predetermined rotations of the control means upon movement of the armature to the attracted position.

ROBERT M. BENNETT.
GERALD H. SYROVY.